(12) United States Patent
Ross (10) Patent No.: US 6,208,248 B1
(45) Date of Patent: Mar. 27, 2001

(54) QUICK RESPONSE PERIMETER INTRUSION DETECTION SENSOR

(75) Inventor: Gerald F. Ross, Longboat Key, FL (US)

(73) Assignee: ANRO Engineering, Inc., Sarasota, FL (US)

(*) Notice: Subject to any disclaimer, the term of this patent is extended or adjusted under 35 U.S.C. 154(b) by 0 days.

(21) Appl. No.: 09/239,352

(22) Filed: Jan. 28, 1999

(51) Int. Cl.[7] ................................................. G08B 13/187
(52) U.S. Cl. ........................ 340/552; 340/554; 342/21; 342/28; 342/160
(58) Field of Search ................................. 340/554, 552; 342/28, 21, 160, 159

(56) References Cited

U.S. PATENT DOCUMENTS

| | | |
|---|---|---|
| 3,728,632 | 4/1973 | Ross . |
| 3,735,398 | 5/1973 | Ross . |
| 3,739,392 | 6/1973 | Ross et al. . |
| 3,755,696 | 8/1973 | Nicolsen et al. . |
| 3,772,697 | 11/1973 | Ross . |
| 3,858,204 | 12/1974 | Robbins et al. . |
| 3,858,205 | 12/1974 | Ross . |
| 3,983,422 | 9/1976 | Nicolsen et al. . |
| 4,083,049 | * 4/1978 | Mattern et al. ............ 342/159 |
| 5,216,695 | 6/1993 | Ross et al. . |

* cited by examiner

*Primary Examiner*—Glen Swann
(74) *Attorney, Agent, or Firm*—George Grayson (57) ABSTRACT

An Ultra Wideband (UWB) short-range radar system is used for the detection of targets in clutter. Examples of targets on the ground include human walkers, crawlers and runners, and vehicles. The UWB sensor can also be used to detect small approaching boats in different levels of sea clutter or airborne targets like hang gliders. One of the primary differences between this device and other UWB radar sensors is the manner in which the bias on the threshold detector is set as well as the logic circuitry used to find targets in clutter while maintaining a low false alarm rate. The processing is designed to detect targets in varying degrees of clutter automatically. There may be no front panel controls other than an ON-OFF switch. The system is lightweight, low-cost, and can be easily installed in minutes.

14 Claims, 8 Drawing Sheets

QUICK RESPONSE PERIMETER INTRUSION DETECTION SENSOR

REFERENCES

U.S. Patents Documents a. U.S. Pat. No. 3,728,632 April 1973 Gerald F. Ross Transmission and Reception System for Generating and Receiving Base-band Pulse Signals Without Distortion
b. U.S. Pat. No. 3,735,395 May 1973 Gerald F. Ross Base-band Short Range Pre-collision Sensor for activation of Vehicle Safety Apparatus
c. U.S. Pat. No. 3,739,392 June 1973 Gerald F. Ross, Kenneth W. Robbins Base-band Radiation and Reception System
d. U.S. Pat. No. 3,772,697 November 1973 Gerald F. Ross Base-band Pulse Object Sensor System
e. U.S. Pat. No. 3,755,696 August 1973 A. M. Nicolson, Robert Brophy Detector Having a Constant False Alarm Rate and Method for Providing Same
f. U.S. Pat. No. 3,858,205 December 1974 Gerald F. Ross Baseband Precollision Sensor with Time-domain Gating for Preventing False Alarms
g. U.S. Pat. No. 3,858,204 December 1974 Kenneth W. Robbins Closed Loop Gain Control Tunnel-Diode Baseband Object Detector
h. U.S. Pat. No. 3,983,422 September 1976 A. M. Nicolson, Richard M. Mara Detector Having a Constant False Alarm Rate
i. U.S. Pat. No. 5,216,695 June 1993 G. F. Ross, R. M. Mara, K. W. Robbins U.S. Pat. No. 5,307,079 (a divisional) Short Pulse Microwave Source with a High PRF and Low Power Drain

Publications j. C. L. Bennett, G. F. Ross Time Domain Applications and its Applications Invited Paper, Proceedings of the IEEE, Vol. 66, No. 3. pp. 299–318.
k. Edmond Miller, Editor, Time-Domain Measurements in Electromagnetics, Van Nostrand Reinhold, New York, 1986
l. H. Bertoni, L. Carin, L. Felson, Ultra Wide-band Short Pulse Electromagnetics, Plenum Press, New York 1993

BACKGROUND OF THE INVENTION

1. Field of the Invention

This invention relates to the field of short-range radar sensors on land and water used to protect assets against unwarranted intruders and terrorists.

2. Description of Prior Art

There is a continual requirement to protect a given perimeter over wide angles from approaching intruders. This is often to protect military assets but also can be used for home and industry as well. Intruders may take the form of walkers or crawlers or runners or even vehicles. For shipboard application, intruders may approach a docked ship in a harbor under a variety of sea state conditions. Sensors currently used to provide perimeter detection employ a narrow microwave beam breaker system similar to a photoelectric device. The microwave beam breaker is subject to high levels of false alarms especially under varying weather conditions; the photoelectric system is, generally, limited in range. Both the photo-electric and microwave beam sensors cannot look beyond, for example, a fence; an alarm is sounded only when the beam barrier is crossed.

Ultrasonic sensors provide an ability to look out beyond the fence or barrier. Their range, however, is limited to less than 100 feet. Some sonic sensors have ranges beyond 100 feet, but cannot resolve multiple targets. Optical cameras, coupled with infrared night-vision and motion-sensing capabilities, can only view narrow azimuths, and are currently very expensive to implement. Radar sensors, as described in references j and k, appear to have the best properties for establishing wide-angle coverage over a perimeter over hundreds of feet in front of a fence or barrier without clutter while establishing a sufficient resolution to detect human and vehicle targets. However they are subject to false detections because of clutter.

In uncluttered areas, CW-Doppler, FM-CW and Ultra-Wideband (UWB) short-pulse radar sensors have been used to detect and resolve walking and crawling human targets over ranges measured in hundreds of feet. The limits on detecting crawling targets depend on the height and frequency of the radar sensor because of likely signal cancellation due to ground bounce. Besides being a very low radar cross-section target, the radar response from a crawler close to the ground is especially sensitive to ground bounce cancellation. This is because the differential path lengths between the direct and ground bounce signals are very small. It can be shown that the differential path length, $\Delta$, between the direct wave and that of the ground bounce signal is given by: $\Delta=2hH/r$, where h is the height above ground of the crawler (e.g., 1 foot), H is the height of the radar antenna above the ground, and r is the distance to the crawler. It can be seen that for distances as close as 150 feet, and a radar height of 10 feet, the differential path length before cancellation begins is only $\Delta=20/150$ feet or 0.133 feet. And since the speed of light travels one foot in 1 nanosecond, this translates to a time delay difference of but 133 picoseconds. If the ground is wet, the reflection coefficient can be as high as 0.8. For these reasons, it can be shown that a short pulse UWB radar with a chosen nominal center frequency whose period is four times 133 ps or less will permit detection of crawlers within the first quarter cycle before cancellation begins. This is described in references c and d.

A prime problem is to somehow accommodate, automatically, the varying amounts of ground or sea clutter present within the radar field of view, and still achieve detection while maintaining a high probability of detection and a low probability of false alarm. The subject invention addresses and solves these issues.

OBJECTS AND ADVANTAGES

An object of the subject invention is to detect walking, crawling, running human targets and vehicles in cluttered areas with a high reliability and a low false alarm rate.

It is another object of the invention to detect these targets in cluttered areas over broad angles.

It is yet another object that the invention operate under all weather conditions.

It is still another object that the invention detect small boats approaching the stem of a ship when docked in harbor or at anchor even during rough weather.

It is yet another object that the invention detect unmanned aerial vehicles or hang gliders in a terrorist attack.

It is still another object of the invention to have increased range against airborne targets.

It is yet another object that the cost of the invention be minimal.

It is still another object of the invention that installation take a minimum of time, be in a waterproof container and have virtually no front panel controls.

It is yet another object of the invention to operate for extended periods of time without requiring human intervention in the absence of primary power.

It is still another object of the invention to provide a local and remote alarm signal.

It is yet another object of the invention to provide a covert radio link to transmit an alarm and reset the sensor.

Still further objects and advantages will become apparent from a consideration of the ensuing description and accompanying drawings.

DESCRIPTION OF THE DRAWINGS

FIG. 6a 40 MHz Clock Pulses

SUMMARY OF THE INVENTION

The objects and advantages of the subject invention are achieved in the preferred embodiment described herein. According to the preferred embodiment of the invention, a UWB short-range radar is used to detect a variety of targets embedded both in clutter and noise. (References a, b, c and d) The radar employs a novel constant false alarm rate (CFAR) threshold detector in conjunction with sequential range gating scheme to reduce false alarms; this is the kernel concept of the invention. The operating parameters of the preferred embodiment have to be chosen to permit rapid deployment, all weather operation, low primary power drain, minimal weight and volume. Also selected are a set of radar parameters such as effective radiated power (erp), nominal band center, pluse repetition frequency (PRF), effective beamwidth, etc, depending on the specific application. It has been established that a UWB radar contains far fewer electronic parts than conventional radar and, as a result, the cost of these radar sensors is substantially less than competing techniques, especially where short range, high range resolution for determining the number of intruders, and wide beam applications are necessary.

Figure 7:
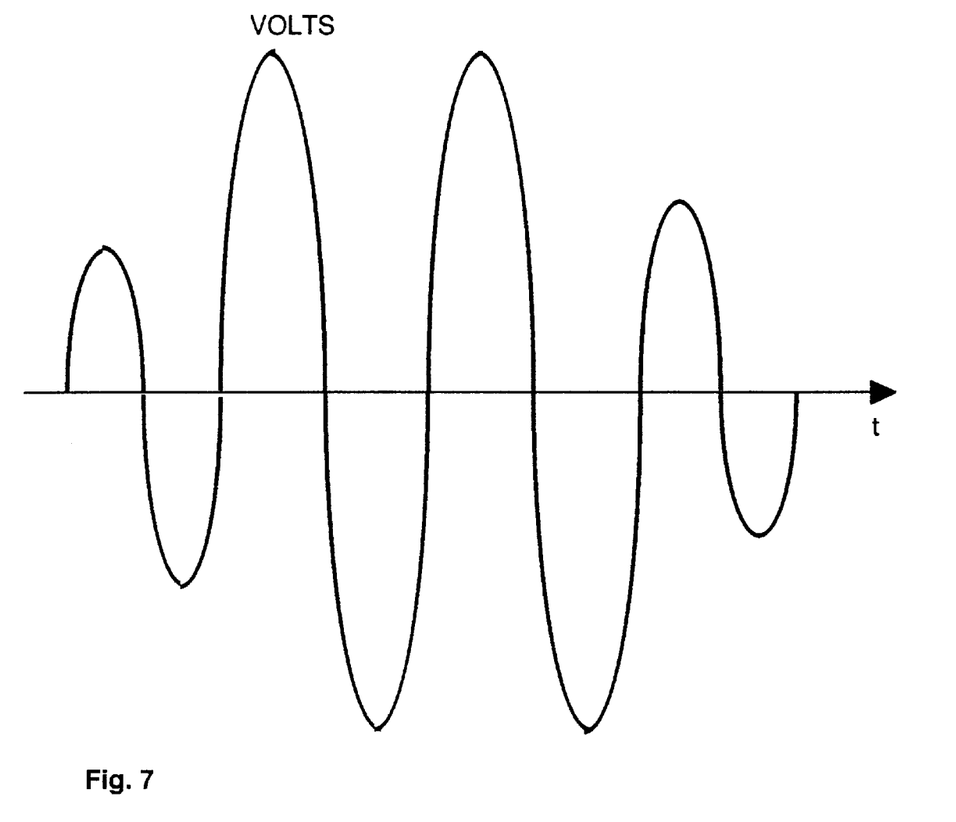
FIG. 7 Typical UWB Waveform

UWB impulse technology is distinguished from conventional radar by the manner by which it generates and receives signals (References j, k and l). In the preferred embodiment of the invention, a high voltage, short duration baseband or video pulse is used to excite an antenna, and the resulting radiated signal represents the impulse response of the antenna. The duration of the pulse response is related to the bandwidth and the dimensions of the antenna; for example, for an S-band half-wavelength resonant dipole mounted above a ground plane, the duration is just a few nanoseconds (billionths of a second). A typical UWB waveform generated by impulse exciting a dipole element mounted above a ground plane is shown in FIG. 7.

Special receivers are required to detect such short duration signals. Although not an optimum detection device (i.e., it is not a so called matched filter), a constant false alarm rate (CFAR) threshold detector has proven to be both effective and inexpensive. The original UWB CFAR threshold detector was invented in 1973 (see References e, h and g). To effectively detect targets in ground and sea clutter, the design must be substantially modified to automatically sense the level of the clutter and noise and self adjust for optimum target sensitivity. The QUPID UWB radar (an acronym for QUick response Perimeter Intrusion Detection) employs a substantially modified version of this CFAR detection threshold detector circuit for its operation. The CFAR receiver uses a tunnel diode device as the threshold element.

Figure 2:
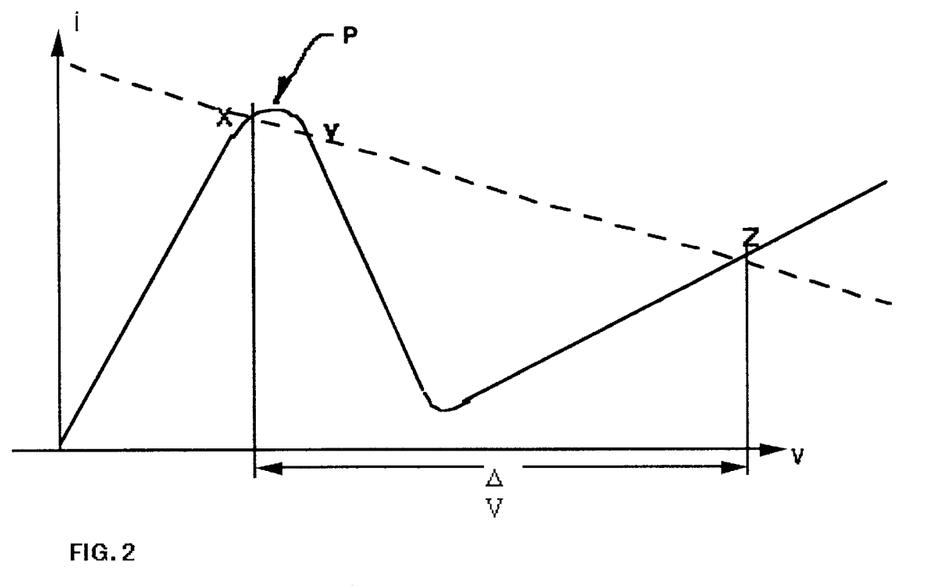
FIG. 2 I–V Properties of a Tunnel Diode Threshold Detector
Figure 3:
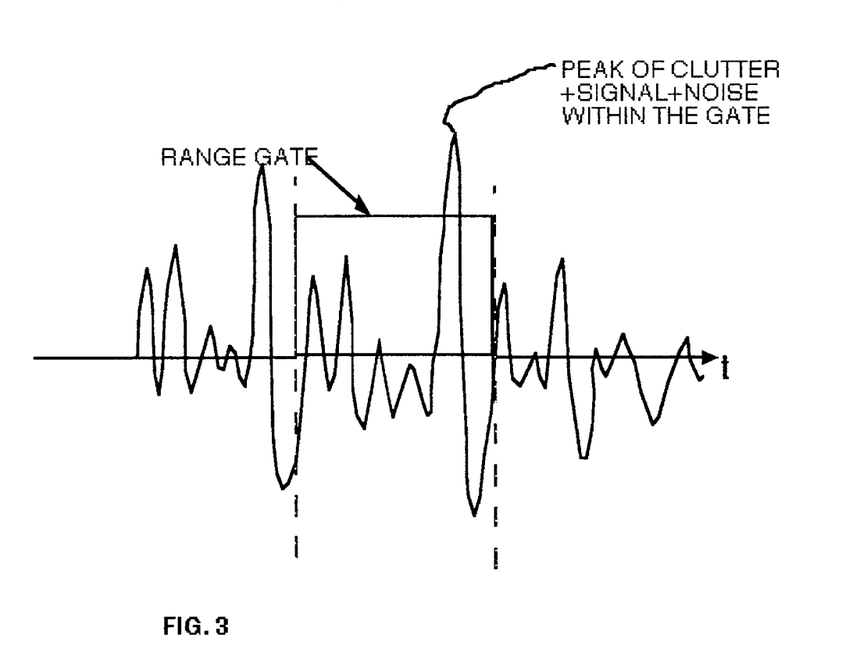
FIG. 3 Clutter Level in Typical Range Gate Window

The i-v properties of a tunnel diode are shown in FIG. 2. A tunnel diode has the unique property of changing states in small fractions of a nanosecond. By applying a pulsed current to the tunnel diode through a resistor to establish a range gate or window in time, the so-called load line for the device can be drawn as shown in the figure (Reference k). Upon application of the range gate, the tunnel diode is set to operate at stable point X on the curve; Y is an unstable point of negative resistance. If a small and short duration incident RF signal is placed directly across the tunnel diode sufficient to cause switching, then the tunnel diode changes its state to stable point Z. The voltage swing, $\Delta V$, is then held at stable point Z until reset (i.e., the tunnel diode operates in a bistable mode). For the germanium tunnel diode chosen for this application, the voltage swing, $\Delta V$, is large enough and stretched sufficiently to operate conventional logic chips that follow. The bias at point X can be established manually, but must be set critically close to the threshold, P, to achieve maximum sensitivity. A constant false alarm rate (CFAR) threshold detector was established earlier by setting the bias point X, for maximum sensitivity using thermal noise alone. This was accomplished by setting the bias of the tunnel diode during short periods when the transmitter was OFF. A DC feedback closed loop was established to always keep point X at maximum sensitivity even though the i-v curve changed with temperature. To accomplish this, a separate noise-sensitive register was used to develop the operating bias for the tunnel diode. When the transmitter is activated, the tunnel diode detector changes states only when the return exceeds the established thermal noise bias level as determined by a separate target register. If the returned target signal is significantly greater than the clutter signal also present in the range gate window, the system operates properly. If instead, the clutter is greater than the signal from an intruder, then the threshold detector will always alarm on the clutter. In most practical situations, the return from clutter is greater than the target return especially for very broad antenna pattern systems created purposely to achieve the largest possible coverage angle using a single radar sensor. In the subject invention, establishing the tunnel diode bias with the transmitter always ON solves the problem. In other words, stable point X is established by noise+clutter and automatically and continuously adjusts to the clutter peak in the range gate. A typical clutter pattern in a range gate window is shown in FIG. 3.

In the subject invention, a detection is not made when the target exceeds the threshold P, but rather by determining that the peak of the clutter pattern has changed during the range gate period because of an intruder's presence within the gate. This approach is feasible because of the scattering properties of targets in clutter, as described next.

It is important to note that for very short pulse radiation, the composite return from a target is determined by the resolved target scattering centers on the body, e.g., the head, the arms, the torso, etc. This includes, of course, the returns from clutter (e.g., a tree or a large boulder) within the gate. The tunnel diode CFAR detector is an ideal device for detection of a changing clutter pattern because it always sets the operating point X on the peak of the clutter+noise within the range gate. It was found, in testing, that this peak varies even when an intruder attempts to remain absolutely still. The waveform is very complicated, as expected, but the peak value within the range gate changes sufficiently over a short time to positively identify that an intruder is present within the range gate.

In retrospect, it is not surprising that the peak of the signal+clutter+noise pattern changes considerably even with small target movements. The composite return is as a result of the constructive and destructive portion of the signal reflecting off the targets and clutter objects as well as their ground-bounce returns; the differences of large numbers. This has also been verified by outdoor measurements. The result is an important criterion to use for detection; namely, determine detection by monitoring the change of the peak of the returns within the range gate.

In the subject invention, the CFAR loop is set to establish operating point X on the basis of clutter+noise with the transmitter ON. A digital register is used to establish the bias for stable point X based on clutter and noise. From pulse period to pulse period of transmission the thermal noise riding on top of the clutter is used to set operating point X by requiring that statistically 16/32 transmissions, on the average, in a sliding time domain window of observation cause the tunnel diode to change states. The closed DC feedback loop is set for this signal to probabilistically exceed the P threshold. The feedback bias loop has a very long time constant (e.g., 50 milliseconds). The principal idea here is that if any intruder either attempts to enter the gate or is present within the gate and moves, the peak of the signal+clutter+noise pattern will either get larger (constructive interference) or smaller (destructive interference) and will fluctuate rapidly. We arbitrarily decide that if the number of hits as recorded in the target register vary by, say, more than +/− 8 hits from the nominal 16/32 hits within 12 pulse periods, then a target is declared. Because of the long time constant of the bias control circuitry, the voltage to the tunnel diode essentially remains constant during 8 to 12 pulse periods when the number of actual hits in the register either goes up or down. A change in the count of hits within a range gate position is the first indication that a target may be present.

Figure 4:
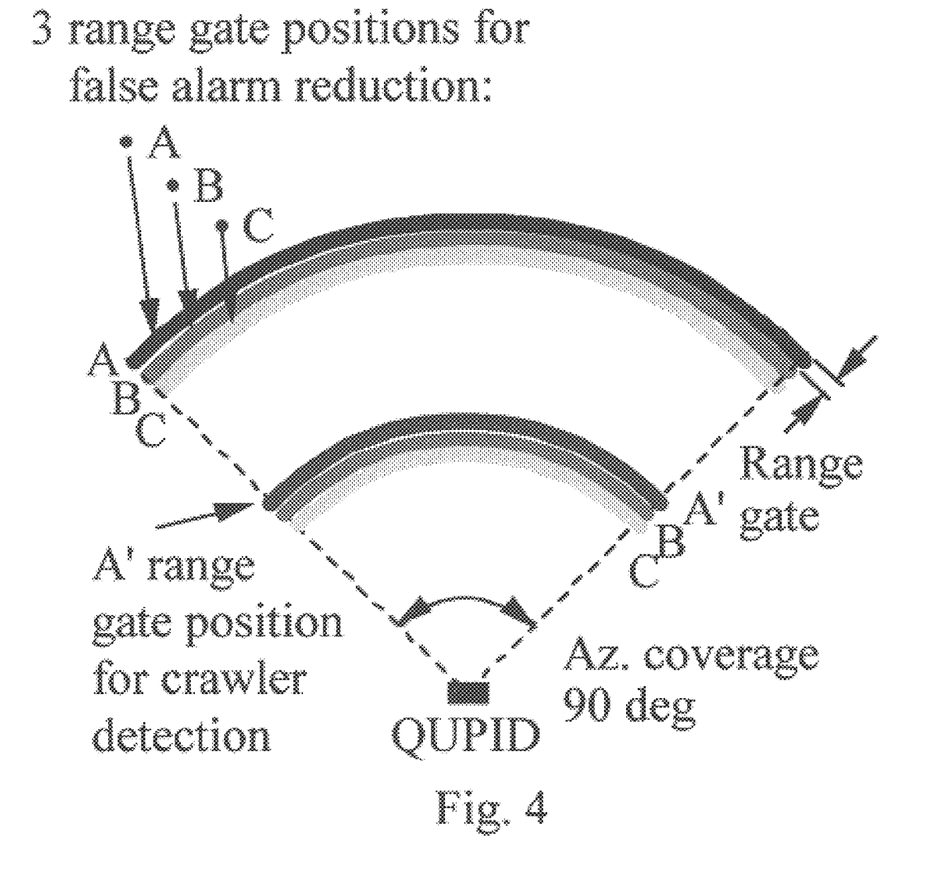
FIG. 4 Range Gate Processing Scheme for Reducing False Alarms

The QUPID sensor then uses a novel range gate-processing scheme to further reduce possible false alarms (Reference f). Typically, the azmuithal angular coverage of a UWB radar is +/− 90 degrees or greater for a horizontally polarized half wave resonant dipole mounted above a ground plane; a vertically polarized radiating element will have a different angular coverage. By placing an n-foot wide range gate, A, in space, where n, for example, can be 12 feet in width, we provide a radar fence that will alarm when a target is detected as described above. Range gate A is shown in FIG. 4. If a target is detected in A, then the range gate is shifted in time 12 feet closer to the radar, into a new position, B. Depending upon the speed of the intruder, we would expect to receive another target indication in B within a prescribed time period. If an approaching target is detected in B, then the gate shifts another 12 feet closer to the radar to position C. If, once again, the target in C moves within the expected time period, then the alarm sounded. Thus, only targets that are approaching the protected area in an expected time period will trigger the alarm. The alarm can be in the form of a light or a sonic alarm at the radar or a coded radio signal to some central monitoring station. All three range gate positions, A, B and C, although occurring separately in time, are contiguous in space.

Range gate A is usually placed at the maximum range, e.g., 300 feet, to detect a walker or runner. If the intruder is a crawler, it is possible for him/her not to be detected at this range because the radar cross section is so small. For this reason, a fourth gate is used in the preferred embodiment of the invention to alternate with A; this is the so-called A' (A-prime) gate. It alternates with A at a 50% rate. Gate A' is set at the maximum range for positive detection of a crawler; for example 150 feet. As before, whether in the A or A' gate, if a target indication is reported, then gates B and then C are activated when the target speed and speed is correct.

A target may be indicated in A or A', but not in B, because either the target is not traveling at the correct speed, direction, or it may also be a false alarm. In this case, the alarm would not be sounded and the system would reset and return to the default range gate positions A or A'. Similarly, if hits are received in the right sequence in both A or A' and B, but not C the system would return to the default position A or A'. The result is a very low false alarm rate. If there was an intruder in A or A' who had decided to stop he/she would be detected again in A or A' when there was movement.

We have described the use of, essentially, four range gate positions to assure detection of walkers, crawlers, and runners and vehicles on the ground with a very low false alarm rate. But, the sensor can also be used on a ship in harbor or at anchor to protect against unwanted boarders. Here, the range gate sequence or the number of gates can be different to further minimize false alarms caused by varying states of sea clutter. In still another application, unmanned aerial vehicles (UAV) or hang gliders, may be detected by changing the number of gates and the timing of these gate positions. Ultimately, depending on time constraints, the entire space between the radar and the protected space can be scanned forming a radar map. Targets could then be detected by comparing their maps scan-to-scan for changes.

The QUPID sensor contains a UWB transmitter specially designed to conserve on primary power (Reference i). A central clock is employed having a PRF ranging from 1–10 kHz which triggers the transmitter depending on the range of targets to be detected. To significantly reduce the appearance of spectral lines, the PRF may be jittered. It can be shown that if the PRF is randomly jittered at a rate approaching 90%, the first and succeeding spectral lines present in the transmitted signal are reduced by 20 dB or greater. The result is a received signal approaching white noise in viewing, and the transmission is difficult to detect other than by a specially equipped receiver. The ability to transmit and detect signals without being detected is an important feature in certain installations.

The timing and logic circuitry in the QUPID sensor are set to provide the highest probability of detection for the class of targets expected. Because of certain system time constants, however, special steps must be taken before examining target information in the different range gate positions. Once a target is detected, for example, in gate A, the gate is switched to B as described above, except detection is not permitted by the logic circuitry for a short period (for example, 50 ms). This is to give the tunnel diode CFAR threshold detector sufficient time to stabilize primarily on the clutter experienced in the new range gate position. Since the beam is so broad, different clutter conditions are likely to be present in range gate positions A, A', B, and C. To establish an average of 16/32 possible hits in the bias setting register, it is necessary for the loop to stabilize before making a target decision. Indeed, a different peak signal may exist in each range gate position.

The QUPID receiver in the preferred embodiment of the invention is protected by a fast acting RF switch to prevent people or vehicles passing in front of the radar from reflecting such a large signal back to the front-end of the radar as to possibly damage the receiver preamplifier. In addition, a bandpass filter is used to reduce large spurious and out-of-band signals from further backing off the tunnel diode CFAR threshold. The preferred embodiment of the QUPID sensor uses two antennas mounted above a common reflector in lieu of using a duplexer to further minimize cost.

PREFERRED EMBODIMENT AND DESCRIPTION OF OPERATION

A successful perimeter detection sensor includes the ability to:

1. Locate the presence of intruders with a high probability of detection and a low probability of false alarm.
2. Detect intruders in moderate clutter environment such as bushes, trees, high grass, rocks, etc., including windy conditions.
3. Detect human targets such as walkers, crawlers, and runners in addition to vehicles at ranges varying from 300 feet for walkers, to at least 150 feet for crawlers
4. Have a coverage angle of 90 degrees or greater.
5. Be quick and easy to install by a single person. Its size should be less than 0.5 cubic feet.
6. Have a low primary power drain so that it may operate over many hours in remote locations from a given battery source.
7. Be covert so that electronic instruments or visual observation cannot easily detect its presence.
8. Be capable of operation in all weather conditions and over wide temperature extremes.
9. Use a technology that is low cost to produce in quantity.

Figure 1A:
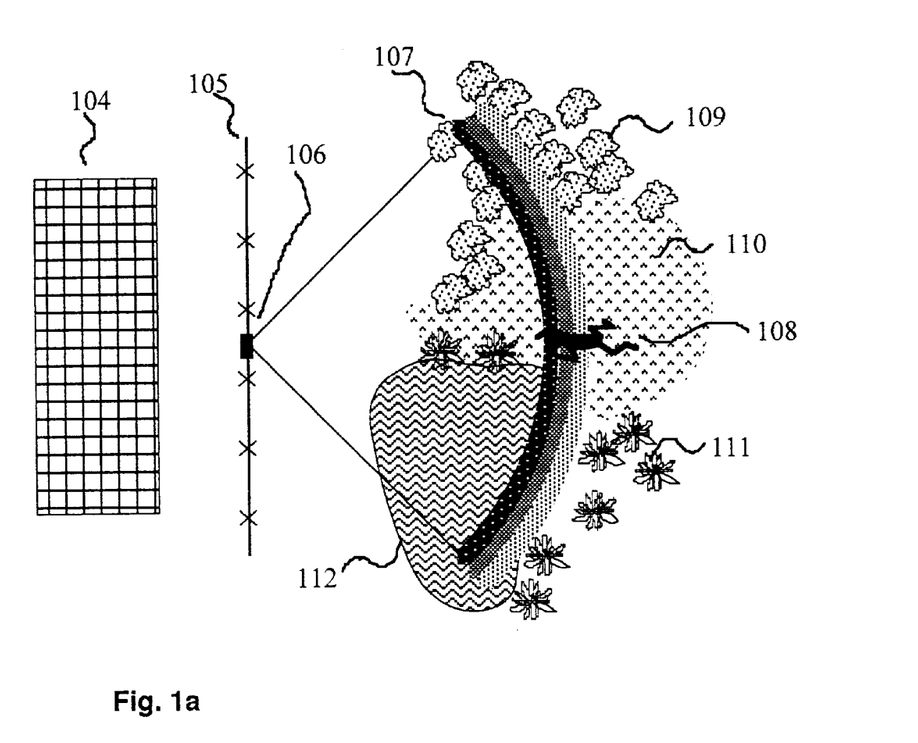
FIG. 1a Quick-reaction Perimeter Intrusion Detection Sensor

Referring to FIG. 1a, the Quick-reaction Perimeter Intrusion Detection (QUPID) sensor can be used to protect areas with personnel or high-value items against intruders. An area such as a dormitory, warehouse or airfield 104 may be protected by a fence 105. A QUPID sensor 106 mounted at the fence can project a range-gated detection zone 107 beyond the fence, providing an "over-the-fence" sensor capability. An intruder 108, such as a person walking, running or crawling, or a vehicle is detected upon crossing the detection zone moving in the direction of the protected area. The area protected against intrusion can contain bushes 109, grass 110, trees 111 or water 112 even in windy environments. Additional QUPID sensors 106 may be placed along the fence with the detection zones 107 overlapping to provide extended coverage along a long fence line.

Figure 1B:
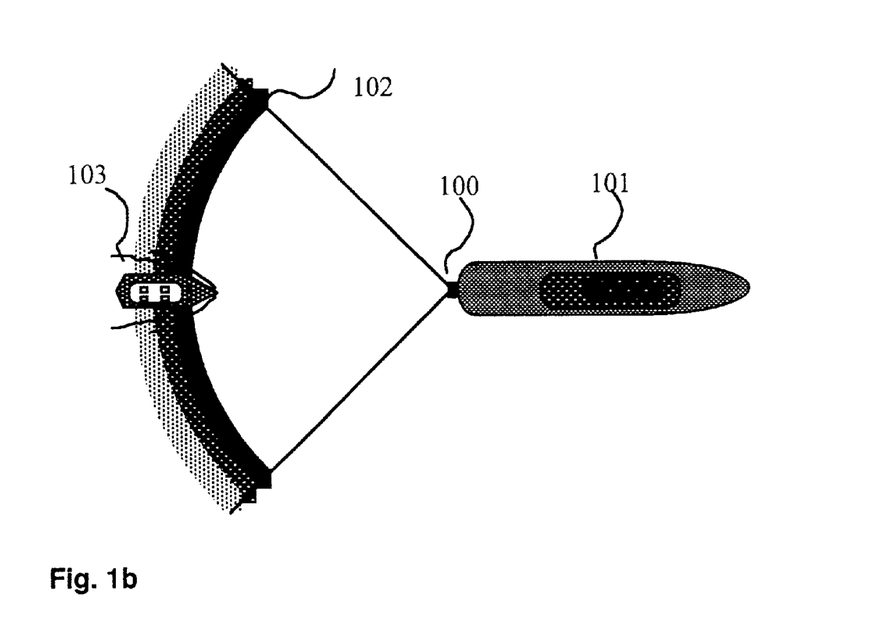
FIG. 1b Ship Stem Intrusion Detection Sensor Radar

An application of the QUPID sensor technology is illustrated in FIG. 1b, where the sensor 100 is mounted on the stern of a ship 101, which may be carrying people or important cargo. Often, the area just aft of the stern of large ships is hidden from view of sentries or persons on the bridge of the ship. The sensor 100 projects a fan-shaped beam beyond the stem of the ship, and detection zone range gates 102 are established at a selected distance. If a ship or small vessel 103 approaches the stern of the ship, the motion of the intruder will be detected, and an alarm sounded. Two or more QUPID sensors may be used to provide protection around the perimeter of the ship.

Figure 1C:
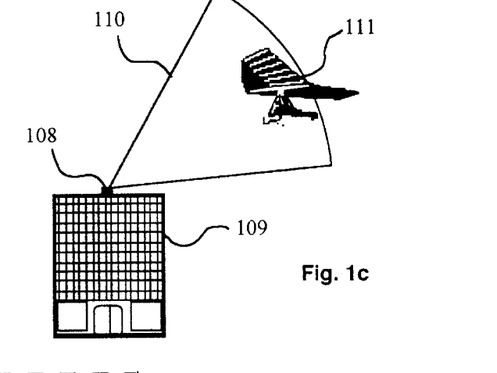
FIG. 1c Stealthy Airborne Intruder Detection Sensor

FIG. 1c shows an application for the QUPID sensor technology for detection of stealthy airborne targets, such as hang gliders, unmanned aerial vehicles and ultralight aircraft. A QUPID sensor 108 can be placed on the roof of a building 109 and oriented upward, projecting a detection pattern 110 upward to detect airborne targets 111. Sensors can also be placed on the ground around the perimeter of an area to be protected, or along roadways or waterways. In this application, the radar sensor is directed skyward and there is virtually no clutter signal present in the range gate. Hence, the bias on the tunnel diode is set, essentially, by thermal noise alone. Note that the register count is still 16/32, but with reference to FIG. 5, to maintain the triggering of the detector 20, the gain of preamplifier 19 must be increased by about 20 dB to compensate for the decrease in the clutter level. This is accomplished by varying to control 11 as used previously for varying sea state conditions for sea applications. Because hang gliders, unmanned aerial vehicles and ultralight aircraft travel about four times the speed of the fastest ground vehicles, the range gate widths must be scaled from 12 feet to about 50 feet to accommodate the expected increase in speed.

Figure 1D:
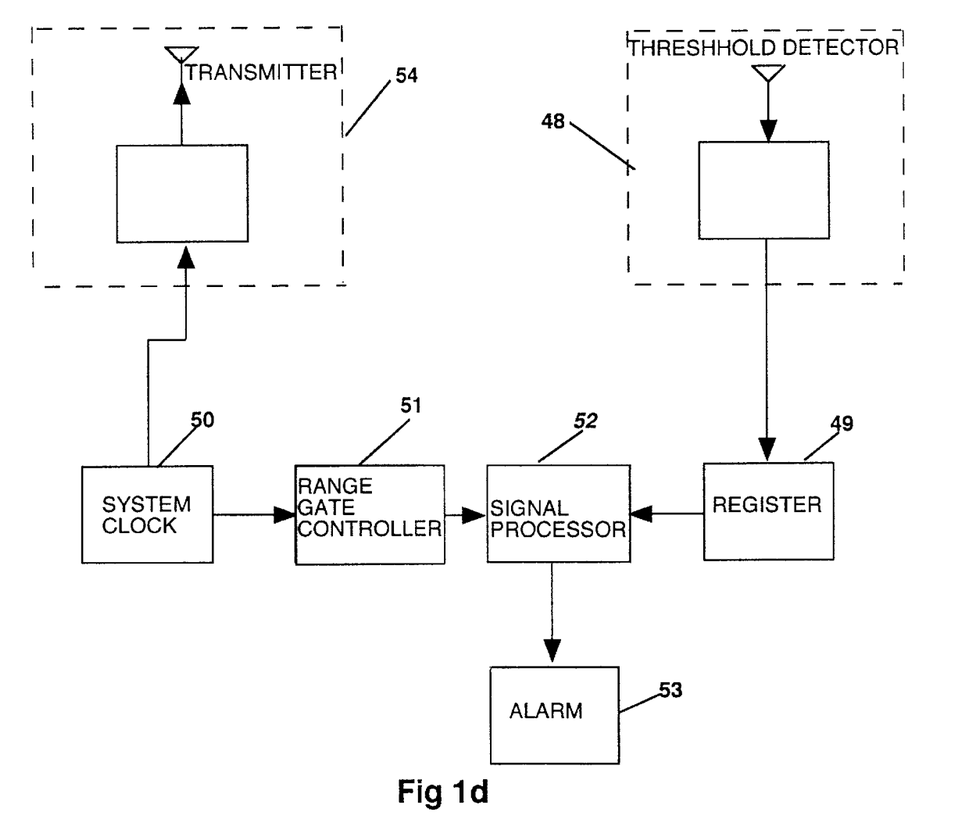
FIG. 1d Overall Block Diagram of the Invention

A simplified block diagram of the subject invention is shown in FIG. 1d. The invention describes a unique version of an Ultra-Wideband (UWB) radar sensor designed to detect walkers and crawlers, and ship-targets, located in both ground clutter and sea clutter environments. The sensor includes a transmitter 54 driven by timing established by a system clock 50. The clock 50 is also used to establish time markers and position the range gates in space in a prescribed manner as described in the FIGS. 5 and 6. A range gate controller 51 is used for this function. The return signals are received by a tunnel diode threshold detection circuitry 48. The output from detector 48 is sent to a target+clutter+noise register 49. The range gate selection and positioning as established by controller 51 and the output from target register 49 are fed to a signal processor 52 which determines the presence of a target. If a target is determined to be present by processor 52, then an alarm is sounded by an alarm circuit 53.

FIG. 2 depicts the i-v characteristics of a typical tunnel diode element. A load line is drawn depicting the bias current passing through the tunnel diode for the particular signal peak shown in FIG. 3.

FIG. 3 illustrates the return from a possible target in a cluttered field as observed during the range gate period by the radiated signal shown in FIG. 1. The waveform shown in the range gate contains reflected signals off the target(s) and clutter as well as thermal noise.

FIG.4 shows the range gate positioning scheme to detect approaching walkers, crawlers, and runners. Range gate positions A and A' are the default positions of the range gates. Half the time the system is in gate position A and the other half in position A' unless a target is detected. In that case the range gate positions B and C may be activated. Range gates B and C may be activated from either A or A'.

Figure 5:
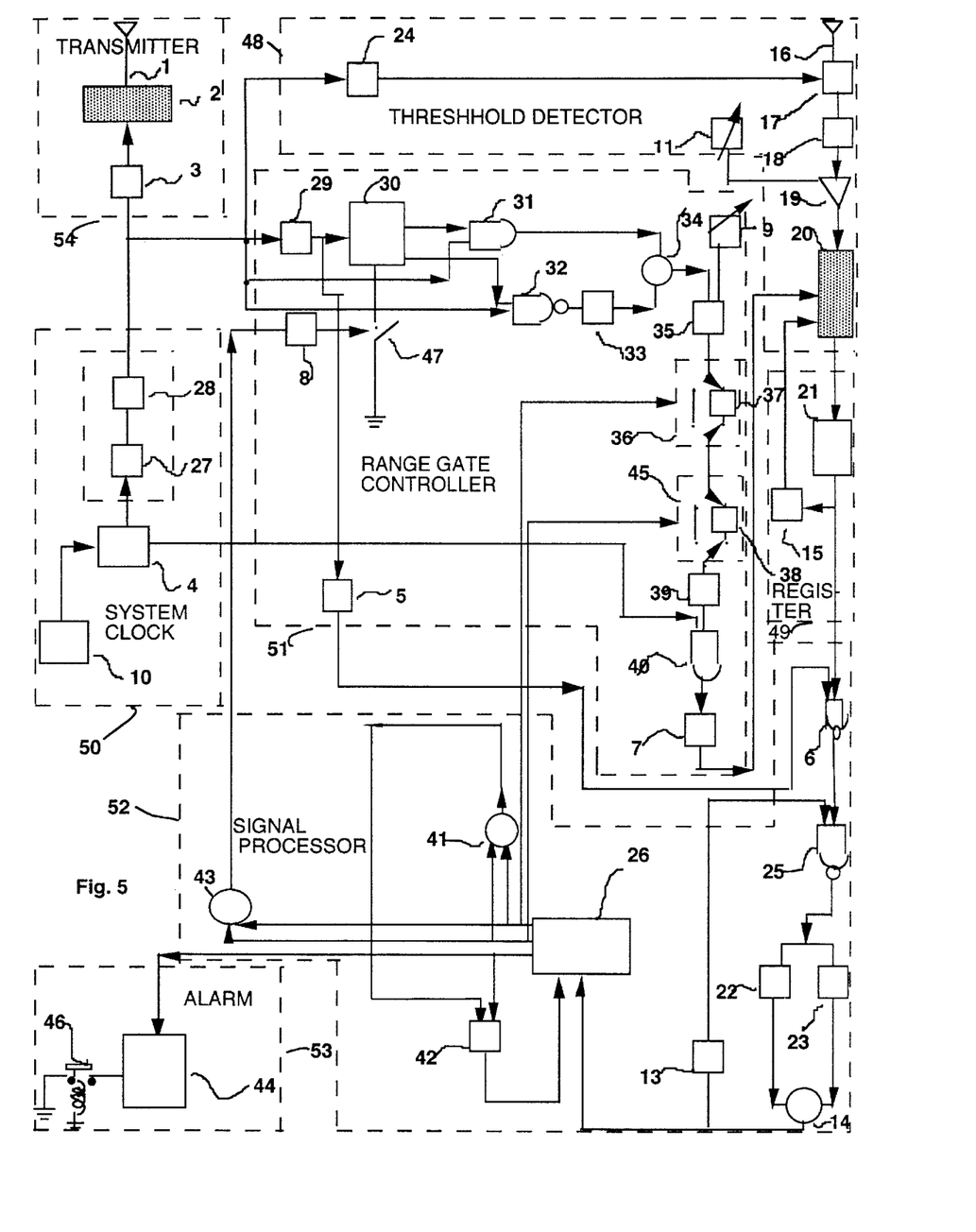
FIG. 5 Block Diagram of A QUPID UWB Radar Sensor

FIG.5 is a logic diagram of the QUPID radar sensor. It shows the preferred embodiment of the invention. A more detailed description of each block follows below.

FIG. 6 presents the QUPID radar sensor timing diagram. This diagram is useful in following the system operation as well as understanding the block diagram shown in FIG. 5.

The transmitting and receiving antenna elements 1, 16, respectively are in the preferred embodiment of the invention dipole elements fed by a wideband balun. This is described in more detail in the Reference j. Depending on the required effective beamwidth required the dipole might be mounted above a simple flat plate or within a conventional corner or trough reflector. A horizontally polarized dipole above a flat plate reflector has about a 120-degree beamwidth in the azimuthal plane. The corner reflector is about 90 degrees while the trough reflector is 80 degrees. The range of the sensor is inversely improved with narrowing the beam width.

This is described in Reference 1.

A previously developed UWB Marx generator 2 is used as the excitation source for the radar (See reference i). The Marx generator 2 when triggered by one shot multivibrator 3, produces up to a 1400 volt baseband pulse that, essentially, impulse excites the dipole radiating element 1, and when mounted above a flat plate reflector produces an S-band waveform of several rf cycles as shown in FIG. 7. The dipole elements are cut to be half wave resonant at S-band.

A system clock 50 sets the PRF of the sensor. The nominal PRF is set to be about 1 kHz to reduce the power drain on the battery. The lowest value for the PRF is determined by having sufficient hits in a 12.5-foot range gate to detect the fastest expected vehicle traveling radially toward the radar. The clock frequency is derived from a 40 MHz oscillator 4. The oscillator frequency is divided by networks 27, 28 to an eventual rate of 1.22 kHz in an unjittered mode. For covert operations, the taps on the countdown chain for the 40 MHz oscillator 4 are selected by a noise-driven random number generator 10 to jitter the PRF by 90 percent. Since the PRF is reduced from 40 MHz to 1.22 kHz, this creates 32,787 twenty-five nanosecond timing intervals between pulses which the random generator can choose for randomizing the pulses transmitted. As indicated earlier, random jittering obscures any spectral lines produced in transmission resulting in a radiated signal, which is noise-like in appearance.

Upon application of trigger 3, Marx generator 2 produces an RF pulse packet approximately 20 ns later because of the transit time in 2. For this reason, a 50 ns one-shot multivibrator 24 opens a PIN diode switch 17 to ensure that a reflected signal from a person or vehicle passing in front of the radar during this time will not damage the preamplifier 19. The output from the PIN diode switch 17 is fed to a bandpass filter 18 to provide additional filtering of the received signal by incidental radiation from other sources. The effect of this radiation would be to back off the tunnel diode CFAR threshold detector and reduce system sensitivity. The bandwidth of the bandpass filter 18 is set at 500 MHz which is necessary to receive about a 2 ns duration rf pulse packet while only marginally degrading the amplitude of the return.

The output of bandpass filter 18 is fed to a variable gain S-band preamplifier 19 having a maximum gain of 40 dB. It is useful to have the ability to vary this gain by about up to 20 dB for detecting targets in high sea state clutter environments; the maximum gain of 40 dB is required for the detection of airborne targets at ranges of typically 500 feet or greater. This adjustment in gain by control 11 may be necessary during periods of saturating clutter caused by the high sea states when the QUPID sensor is used to protect ships moored in harbor or offshore. The output of the variable gain preamplifier 19 feeds a tunnel diode CFAR threshold detector 20 which has been modified from its original concept (References e, h, & g) to self-bias on noise+clutter, and is supported in its new role by a 32-bit register 21 and a DC bias control network 15. The register 21 is driven from a +5 volt supply so that each bit represents 0.15625 volts. A germanium tunnel diode is used in the CFAR threshold detector 20 because of its sensitivity and large output swing. The tunnel threshold detector 20 operates always at the point of maximum sensitivity with the actual bits in the register varying statistically on the basis of random noise+clutter. The DC output voltage from the register 21 feeds the bias control network 15 and is adjusted to be 2.5 volts corresponding to 16 bits.

The tunnel diode threshold detector 20 is range-gated by pulses arriving at specified times by generator 7. The range gate is 25 nanoseconds in width corresponding to about a 12 foot gate in space. Once the tunnel diode threshold detector 20 fires (during the range gate period), the stable state Z in FIG. 2 is maintained for 300 nanoseconds by internal circuitry within the detector 20 before the tunnel diode is once again reset to stable state X. This stretching is necessary to provide sufficient time for register 21 to record the data.

The DC data level in the 32-bit register 21 is held until the next transmitted pulse period. That DC level is fed to three different circuits. The first circuit 15 is the DC bias control network, which is fed back to the tunnel diode threshold detector 20. The bias control network consists of resistors and capacitors designed to smooth or integrate the changing DC levels between pulse transmission periods. The time constant of this network is about 40 milliseconds. In other words, the DC output from target register 21 may change from transmission period to transmission period (e.g., a zero order hold network), but the DC output applied to the bias network for the tunnel diode threshold detector changes only diminuously over any, say, ten periods. The result is that the bias on the detector 20 is, essentially, fixed. The long term effect of the bias level created by 15 is to permit, on the average, only 16/32 signal plus clutter plus noise hits to exceed the threshold X. If a target moves into the range gate, then the register will rapidly record more or less than 16/32 bits because of either constructive or destructive target and clutter interference, respectfully, as described earlier. If there is an increase or decrease in the register during this period by more than 8 bits, then either high bit or low bit threshold detector 22 or 23, respectively, registers an output. These thresholds may also be adjusted by later application experiences. Both the outputs from 22 and 23 are fed into OR network 14 because either a high or low change in the register count is sufficient to announce a possible detection.

The output from OR network 14 is a trigger pulse, which is used to excite a 50-millisecond millisecond monostable or one-shot multivibrator 13. Multivibrator 13 prevents any signal from again reaching the threshold detectors 22 and 23 for 50 ms through the action of NAND network 25. The second output of OR network 14 is sent to the range generator selection network 26 to actually shift the position of the range gate to B from either of stable positions A or A'. The result is that the range gate is placed in position B, and the CFAR threshold detector 20 stabilizes on the noise and clutter in the new range gate position. Similarly, when a detection is recorded in range gate position B, the range gate is shifted to position C and the process repeats. This is illustrated with the help of the timing diagram shown in FIG. 6. Note also that each time the position of the range gate changes, the threshold detectors 22 and 23 are also inhibited for 50 milliseconds by one shot multivibrator 5 and NAND network 6 which is necessary for closed-loop CFAR detector stabilization. For a signal to pass to detectors 22 and 23, there must be an output from the register 21 and not an output from 5.

Figure 6A:
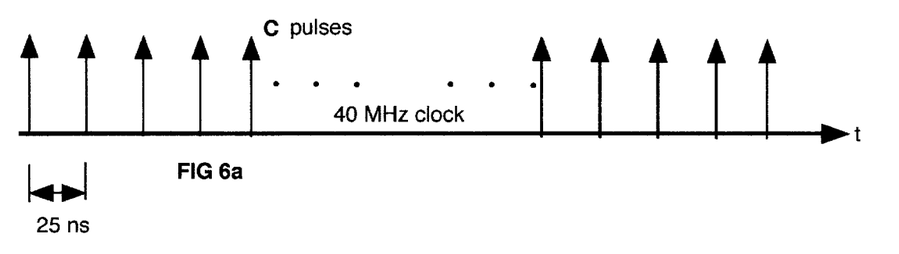
Figure 6B:
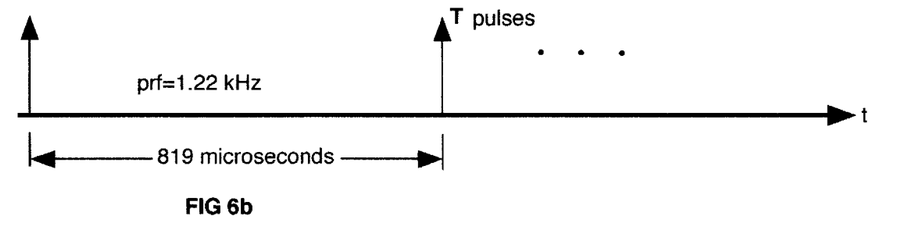
FIG. 6b Transmitter Trigger Timing Pulses
Figure 6C:
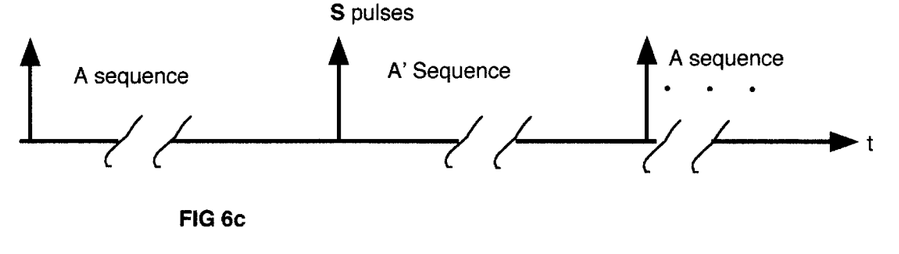
FIG. 6c A–A' Sequence Timing Pulses
Figure 6D:
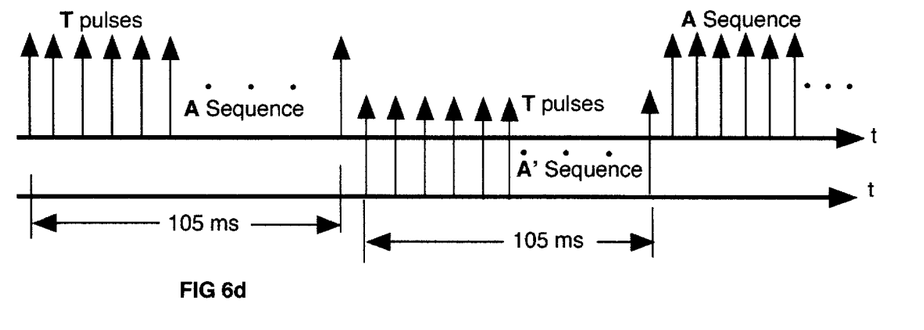
FIG. 6d Transmitter and Sequence Timing Pulses

The 40 MHz oscillator clock 4 provides a train of 25 ns timing markers (termed c pulses) as shown in FIG. 6a. By use of countdown networks 27 and 28, the 40 MHz rate is reduced to a train of transmitter pulses T at a rate of 1.22 kHz. The timing pulses generated by this train of 1.22 kHz pulses T is further separated into two sequences for the development of the A and A' range gate positions at a 50% duty cycle. This is accomplished by counting down the 1.22 kHz pulse train by another factor of 128 by network 29. The new pulse train sequence S is used to excite astable multivibrator 30 which produces an alternating high and low at its two output ports approximately every 100 ms. These outputs are fed to AND and NAND networks 31 and 32, respectively. The result is shown in FIGS. 6b and c; half of the 1.22 kHz timing pulses pass through AND gate 31 while the other half is outputted from the NAND network 32. The pulses passing through NAND gate 32 is additionally delayed 310 ns by one shot multivibrator 33. The outputs from both 31 and 32 are fed to OR network 34. This produces a 100 ms duration train of T pulses that is delayed from the next series of pulses by 150 feet in space. Both the A and A' trains are then both delayed by about 315 ns as a result of one-shot multivibrator 35 in tandem with delay one-shots 37 and 38. Note that the precise range gate delay depends on the coincidence of a trigger timing train c described below with a wider pulse delayed by 33, 35, 37, and 38. But, it is the location of the c pulse which is precise that determines the triggering of the range gate generator 7. The total delay is necessary for the location of the maximum range gate position; 150 feet in free space corresponds to a two-way transit time delay to a target of 300 ns. For desired ranges more or less than the typical 300/150 feet corresponding to walkers and crawlers, respectively, a range select control 9 varies the delay produced by one-shot multivibrator 35.

Figure 6E:
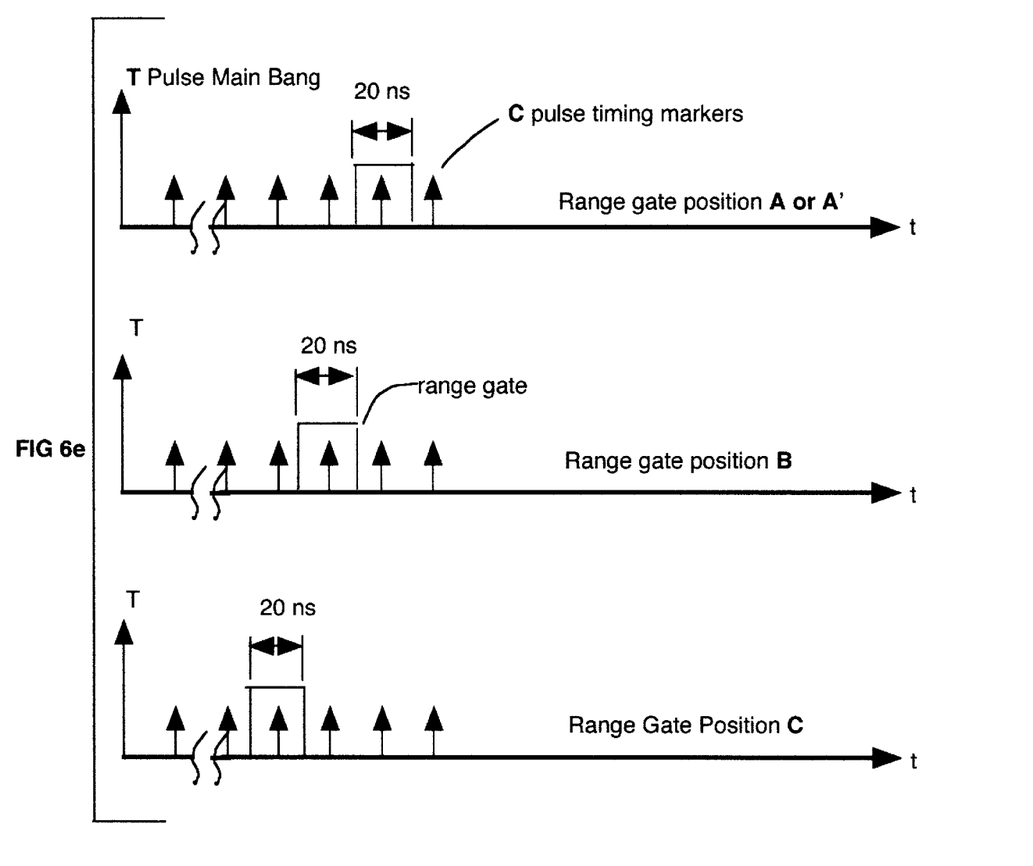
FIG. 6e Range Gate Positions A/A', B or C

The c or 40 MHz clock pulses are shown in FIG. 6a The T pulses shown in FIG. 6b correspond to the actual pulses transmitted and the sequence pulses S are shown in FIG. 6c. The sequence between the S pulses transmitted corresponding to the A and A' range gate positions are shown in FIG. 6c. The coincidence between the T pulses and the clock pulses c for the different range gate positions; namely, A, A', B, and C, is shown in FIG. 6e.

There is about a 20 ns delay between the T pulse excitation to Marx generator 2 and the generation of the main bang. For this reason, an additional delay is added to the range gate delay circuitry by one-shot 39 to accommodate variations in the transmitter triggering for the signal processing as explained next. The delayed T pulse eventually triggers the range gate pulse 7. Note that there is coincidence between the T and c trains only when the output from 39 is present. The delayed T pulse excites one-shot 39 whose pulse width is 20 ns. This one-shot pulse signal and the c clock timing markers feed AND network 40. When both the c pulse and the 20 ns output from 40 are present then a pulse is outputted to 7 which generates the 25 ns duration range gate. No matter what the variation in Marx generator triggering, the location of the range gate is always determined by the precise timing of the c pulses as shown in FIG. 6e. The pulse width of 39 is set to accommodate all possible variations in Marx generator delay.

When the presence of a target within the range gate causes either an increase or decrease in the counts in register 21 then, as indicated earlier, the state of the two bit counter or register 26 changes. The first effect is to stop the alternating of the A, A' sequence through OR gate 43 using driver 8 to disable astable multivibrator 30 by opening PIN diode switch 47. Another of these outputs moves the range gate to position B operating DPDT PIN diode switch 36 and removing 25 ns of delay in the triggering. A third output is fed through OR network 41 to target timer 42. The target timer is set to generate a pulse if it is not again triggered within the time the slowest expected targets (e.g., a crawler) moves across the range gate or in about 45 seconds. This is accomplished via a trigger signal from target tinier 42 that resets the 2 bit counter 26 to its prior state.

If a target is received in range gate B within the proper time settings, then 26 indexes to its next position (e.g., range gate position C). The output from 26 operates DPDT PIN diode switch 45 decreasing the net delay in the tunnel diode range gate triggering circuit by another 25 ns. The output of 26 also restarts target timer 42 and maintains the disabling of the A and A' via PIN diode switch 47 and driver 8.

Finally, if a target is judged to be in range gate C by the changing register levels in 21, then an output is obtained from the third state of counter 26 that (1) initiates the alarm by sending a signal to 44, and (2) recycles the counter 26. This, in turn, re-starts the, A, A' alternating scan and reinserts the time delays via switches 36 and 45. The alarm circuit 44 may be manually reset by push button switch 46, or via a remote acknowledgement signal.

FIG. 7 shows a typical UWB waveform as produced by triggering Marx generator 2 and exciting dipole antenna 1 mounted above a ground plane. Note that this waveform consists of just several cycles of microwave energy. In the preferred embodiment of the invention the frequency of the dipole is cut to be half wave resonant at 2.15 GHz. What is shown in FIG. 7 is, essentially, the impulse response of the dipole mounted above a ground plane. The nominal center frequency of the pulse packet is determined by the resonant frequency of the dipole as measured approximately by taking the reciprocal of the RF period within the pulse packet. The duration of the pulse depends on the bandwidth of the antenna and the spectral content of the baseband excitation.

Having shown and described a preferred embodiment of the invention, those skilled in the art will realize that many variations and modifications may be made to affect the described invention and still be within the scope of the claimed invention. Thus many of the elements indicated above may be altered or replaced by different elements which will provide the same result and fall within the spirit of the claimed invention.

What is claimed is:

1. An Ultra Wideband (UWB) short range covert sensor for detection of an intruder in a cluttered environment, comprising:

a transmitting dipole element cut to be half wave resonant at a predetermined frequency and fed by a wideband balun to produce a radiated signal which is noise-like in appearance to search said cluttered environment looking for said intruder;

a UWB Marx generator for generating a baseband pulse to excite said wideband balun;

a system clock to set the pulse repetition frequency (PRF) of said sensor to a lowest value to detect a fastest expected target traveling radially towards said sensor, said system clock including a random number generator for randomizing pulses being sent to said generator, said system clock further generating a pulse train sequence and a clock pulse sequence;

a range gate controller responsive to said pulse train sequence and said clock pulse sequence for generating a sequential range gate signal of a predetermined duration;

a receiving dipole element for receiving a reflected signal from said cluttered environment and generating a plurality of signals indicating an amount of noise and clutter;

a register for storing bits representative of said plurality of signals and generating an output signal if there is an increase or decrease in said bits by more than a predetermined amount;

a signal processor responsive to said output signal and said range gate signal to generate an alarm signal indicating the presence of said intruder;

an alarm which is activated by receiving said alarm signal and may be reset either manually or remotely.

2. The sensor of claim 1 wherein a one-shot multivibrator triggers said Marx generator to produce said baseband pulse of typically up to a 1400 volt baseband pulse.

3. The sensor of claim 2 wherein said system clock includes:

a 40 MHz oscillator for generating said pulse train sequence; said random generator for generating a series of random pulse sequences;

a divider for receiving said pulse train sequence and said random signals to generate a 1.22 kHz signal which jitters said PRF by typically 90% thereby resulting in said radiated signal being noise-like in appearance.

4. The sensor of claim 3 wherein said range gate controller includes:

a network for receiving said clock signal and generating a sequence of S pulses;

an astable multivibrator for receiving said sequence of S pulses and producing alternately high and low signals typically every 100 milliseconds;

an OR network for receiving said alternately high and low signals thereby producing a 100 millisecond duration train of pulses offset from a next series of pulses by a time corresponding to 150 feet of space;

a multivibrator network for receiving said 100 millisecond duration train of pulses and said pulse train sequence for generating said sequential range gate signal corresponding to an A range distance and an A' range distance, each having said predetermined duration of typically 105 milliseconds.

5. The sensor of claim 4 wherein said receiving dipole element includes;

a bandpass circuit for filtering said reflected signal from incidental radiation;

a variable preamplifier having a maximum gain of 40 dB for receiving and amplifying said filtered signals and having the capability for accepting targets in high sea clutter caused by high seas;

a modified tunnel diode CFAR threshold detector which is self biased on noise and clutter to receive said amplified filtered signals to generate said plurality of signals;

a one shot responsive to said sequential range gate signal for generating a timing pulse;

a range gate responsive to said clock pulse sequence and said timing pulse to generate a timing gate signal;

said threshold detector being responsive to said timing gate signal for timing said radiated signal to said reflected signal.

6. The sensor of claim 5 wherein said register generates said output signal if there is an increase or decrease of, typically, eight bits indicating said intruder.

7. The sensor of claim 6 wherein said signal processor includes:

a high bit and a low bit threshold detector for receiving said output signal;

an OR gate coupled to said high and said low bit threshold detector for generating a trigger pulse;

a range generator selection network is responsive to said trigger pulse for shifting said range gate to position B if said range gate was at positions A or A', and shifting said range gate to position C and generating said alarm signal if said range gate was at position B.

8. A method of using an Ultra-Wideband (UWB) short range sensor for a detection of an intruder in a cluttered environment, including the steps of:

A. Setting a range gate of said sensor of a predetermined width to scan a cluttered area at a distance A from said sensor for a predetermined time interval, B. Switching said range gate to scan said cluttered area at a distance A' from said sensor for if no intruder is detected where said distance A is greater than said distance A', C. Alternately switching said range gate between said distance A and said distance A' after said predetermined time interval, D. Detecting a potential intruder at said distance A or said distance A', E. Reducing said range gate to a distance B wherein said distance B is less by a predetermined distance from said distance A if said intruder was detected at said distance A, and said distance B is less by said predetermined distance from said distance A' if said intruder was detected at said distance A', F. Detecting said intruder at said distance B within a prescribed time period, G. Reducing said range gate to a distance C wherein said distance C is less by said predetermined distance from said distance B, H. Detecting said intruder at said distance C within said prescribed time period, I. Triggering an alarm, J. Returning to step A if no intruder is detected at said range set at said distance B or said distance C within said prescribed time period.

9. The method of claim 8 wherein, said predetermined width of said range gate is typically about 12 feet, said range gate at said distance A is typically set at 300 feet to detect a walker or a runner in said cluttered environment, and said range at said distance A' is typically set at 150 feet to detect a crawler in said cluttered environment.

10. The method of claim 9 wherein, said distance B is typically about 12 feet less than said distance A and said distance A' and said distance C is typically about 12 feet less than said distance B, and said prescribed time period is typically 45 seconds.

11. An Ultra-Wideband (UWB) short-range covert sensor for a detection of an intruder in a cluttered environment, comprising:

a network for sending a sequence of noise-like range gate signals to said cluttered environment;

a receiver for receiving a first sequence of reflected signals from said cluttered environment from a first band at a first predetermined distance from said sensor for detecting said intruder who is upright, and alternatively from a second band at a second predetermined distance from said sensor for detecting said intruder who is crawling, said second band being closer to said sensor than said first band;

a processor for analyzing said first sequence of reflected signals and generating a first detection signal having a first value if said intruder is detected within said first or said second band;

said receiver being responsive to said first detection signal having said first value for receiving a second sequence of reflected signals from a third band, said third band being closer to said sensor than the corresponding said first or said second band;

said processor further analyzing said second sequence of reflected signals and generating a second detection signal having a first value if said intruder is detected within said third band;

said receiver being further responsive to said second detection signal in said first state for receiving a third sequence of reflected signals from a fourth band, said fourth band being closer to said sensor from said third band;

said processor further analyzing said third sequence of reflected signals and generating an alarm signal if said intruder is detected within said fourth band;

said receiver receiving said first sequence of reflected signals if said processor generates said first or said second detection signals having a second value indicating a false detection of said intruder.

12. The sensor of claim 11 wherein said first band, said second band, said third band and said fourth band each have a width of 12 feet with said first predetermined distance being typically 300 feet and said second predetermined distance being typically 150 feet, said third band abutting said first or said second band, and said fourth band, similarly abutting the corresponding said third band.

13. An Ultra-Wideband (UWB) short-range covert sensor for a detection of a glider approaching said sensor comprising:

a network for sending a sequence of noise-like range gate signals to an area in which said glider will approach;

a receiver for receiving a first sequence of reflected signals from said first band at a predetermined distance from said sensor for detecting said glider;

a processor for analyzing said first sequence of reflected signals and generating a first detection signal having a first value if said glider is detected within said first band;

said receiver being responsive to said first detection signal having said first value for receiving a second sequence of reflected signals from a second band, said second band being closer to said sensor than said first band;

said processor further analyzing said second sequence of reflected signals and generating a second detection signal having a first value if said intruder is detected within said second band;

said receiver being further responsive to said second detection signal having said first value for receiving a third sequence of reflected signals from a third band, said third band being closer to said sensor than the corresponding said first or said second band;

said processor further analyzing said third sequence of reflected signals and generating an alarm signal if said intruder is detected within said third band.

14. The sensor of claim 13 wherein said said first band, said second band, said third band each have a width of typically 50 feet with said predetermined distance being typically 500 feet with said second band abutting said first band and said third band abutting said second band, said third band being closest to said sensor.

* * * * *